United States Patent [19]

Weiler et al.

[11] 4,179,767
[45] Dec. 25, 1979

[54] WIPING ARRANGEMENT FOR WIPING A VEHICLE WINDOW

[75] Inventors: Paul Weiler, Kappelrodeck; Dietmar Brümmer, Bühlertal, both of Fed. Rep. of Germany

[73] Assignee: Robert Bosch GmbH, Stuttgart, Fed. Rep. of Germany

[21] Appl. No.: 939,372

[22] Filed: Sep. 5, 1978

[30] Foreign Application Priority Data

Sep. 17, 1977 [DE] Fed. Rep. of Germany ....... 2742022

[51] Int. Cl.² ............................................... B60S 1/40
[52] U.S. Cl. ................................................. 15/250.32
[58] Field of Search ........................ 15/250.31–250.35, 15/250.42

[56] References Cited

U.S. PATENT DOCUMENTS 4,023,232  5/1977  Smithers ............................ 15/250.32

FOREIGN PATENT DOCUMENTS 2310374  9/1974  Fed. Rep. of Germany ........ 15/250.32
2142235  1/1973  France ................................. 15/250.32

Primary Examiner—Peter Feldman
Attorney, Agent, or Firm—Michael J. Striker

[57] ABSTRACT

A wiping arrangement for wiping a vehicle window has a wiper arm having a hook-shaped end part which bounds a gap, a wiping blade, and a connecting element for connecting the wiping blade with the wiper arm in response to sliding entry of the connecting element into the gap. The connecting element has two projecting portions which are biased apart from one another and toward sections of the wiper arm. One of the projecting portions of the connecting element has an engaging formation which engages with an engaging formation arranged in one of the arm sections of the wiper arm so as to provide the above-mentioned connection. The one projecting portion of the connecting element is provided with means for urging this portion apart from the other projecting portion so that the engaging formations become disengaged from one another and thereby the wiping blade can be removed from the wiper arm. The urging means extends outwardly beyond a face of the wiper arm which faces away from the vehicle window.

17 Claims, 5 Drawing Figures

WIPING ARRANGEMENT FOR WIPING A VEHICLE WINDOW

BACKGROUND OF THE INVENTION

The present invention relates to a wiping arrangement for wiping a vehicle window.

Wiping arrangement for wiping a vehicle window have been porposed in the art, which arrangements include means for compressing a U-shaped arm of a connecting element to thereby disconnect a wiping blade from a wiper arm of the arrangement. This means is accessible only in the case when the wiper arm with the wiping blade are swung out of the vehicle window. However, this is impossible in the cases when a shaft of the arrangement is blocked, for instance in the type of arrangement which is concealed in wiper arm parking position.

SUMMARY OF THE INVENTION

Accordingly, it is an object of the present invention to provide a wiping arrangement for wiping a vehicle window, which avoids the disadvantages of the prior art.

More particularly, it is an object of the present invention to provide a wiping arrangement for wiping a vehicle window, wherein a wiping blade can be withdrawn from a wiper arm without removing the latter from its operational position.

In keeping with these objects and with others which will become apparent hereinafter, one feature of the present invention resides, briefly stated, in a wiping arrangement for wiping a vehicle window, which comprises a wiping element, a driven arm element having a hook-shaped end part bounding a gap, and a connecting element secured to the wiping element, located in the gap of the arm element and having two projecting portions which are biased apart from one another and toward arm sections of the arm element, wherein the connecting element and the arm element have interengaging formations for connecting the wiping element with the arm element, and the connecting element is provided with means for urging one of the projecting portions apart from the other projecting portion whereby the interengaging formations become disconnected from one another and the wiping element can be withdrawn from the arm element without removing the latter from the vehicle window. The urging means extends outwardly beyond a face of the arm element which faces away from the vehicle window.

When the wiping arrangement is constructed in accordance with the present invention, the wiping element or blade can be withdrawn from the driven wiper arm element without displacing the latter from its operational position.

Another feature of the present invention is that the connecting element has lateral projections forming a passage into which the hook-shaped end part of the arm element is received, and the above-mentioned urging means is formed as a portion of each of said lateral projections.

Still another feature of the present invention is that each of the portions of the lateral projections of the connecting element is thicker that each of the lateral projections.

A further feature of the present invention is that one of the projecting portions of the connecting element is elastic, and one of the above-mentioned engaging formations is provided in the thus-formed elastic projecting portion.

Still a further feature of the present invention is that the other projecting portion of the connecting element is provided with a recess in which a free end portion of the hook-shaped end part of the arm element is received.

An additional feature of the present invention is that the connecting element is formed as an integral member which preferably is constituted by a synthetic plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
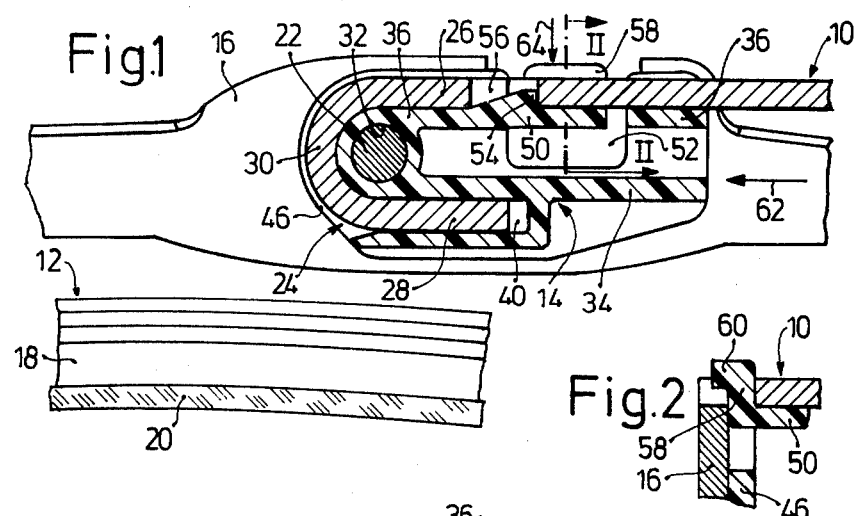
FIG. 1 is a view showing a section of a wiping arrangement in accordance with the present invention.

A wiping arrangement for wiping a vehicle window in accordance with the present invention has a driven wiper arm which is identified in toto by reference numeral 10, and a wiping element or blade which is identified in toto by reference numeral 12. The wiping element 12 is connected with the wiper arm 10 by means of a connecting element which is identified in toto by reference numeral 14. The wiping element 12 has a supporting portion 16 and a wiping rubber member 18 which is connected with the supporting portion 16 by means which are known per se in the art and not shown in the drawing. In operation the wiping rubber member 18 abuts against the upper surface of the vehicle window.

The supporting portion 16 of the wiping element 12 is provided with an axle 22. The connecting element 14 is pivotally connected with the supporting portion 16 of the wiping element 12 by means of the above mentioned axle 22. The wiper arm 10 has a free end part which is connected with the wiping element 12 and is formed as a hook 24. The thus-formed end part 24 of the wiper arm 10 has two arm sections 26 and 28. The arm section 26 transits into a remainder section of the wiper arm 10. The other arm section 28 is connected with the first-mentioned arm section 26 by means of a curved intermediate section 30. The arms 26 and 28 extend substantially parallel to one another.

Figure 2:
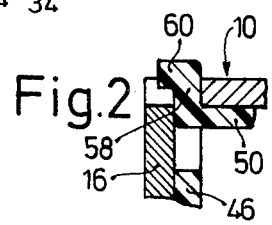
FIG. 2 is a view showing a section of the wiping arrangement taken along the line II—II of FIG. 1.
Figure 3:
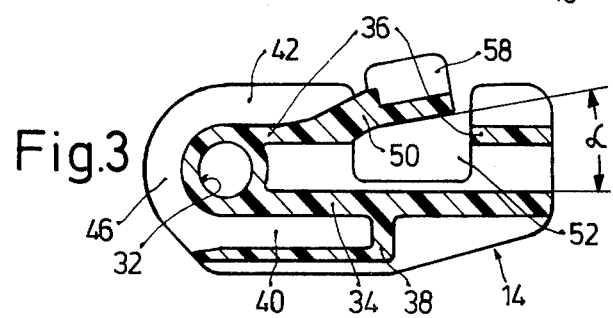
FIG. 3 is a view showing a longitudinal section of a connecting element for connecting a wiping element to a wiper arm element of the arrangement.
Figure 4:
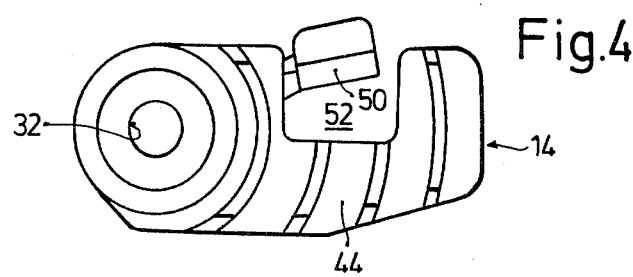
FIG. 4 is a side view of the connecting element.

As can be seen from FIGS. 1 and 2, the connecting element 14 has a substantially U-shaped cross section. The connecting element 14 has, in its base region a hole 32 through which the axle 22 connected with the supporting portion 16 of the wiping element 12 extends. The connecting element has two projecting portions 34 and 36 which extend from its base region and have outer surfaces arranged to abut against inner surfaces of the arm sections 26 and 28. An angular projection 38 is formed on the projecting portion 34 of the connecting element 14. The projection 38 is so arranged that together with the projecting 34 it bounds a receiving recess or pocket 40 for receiving the arm section 28 of the hook-shaped end part 24 of the wiper arm 10 when the latter is connected with the connecting element 14.

Figure 5:
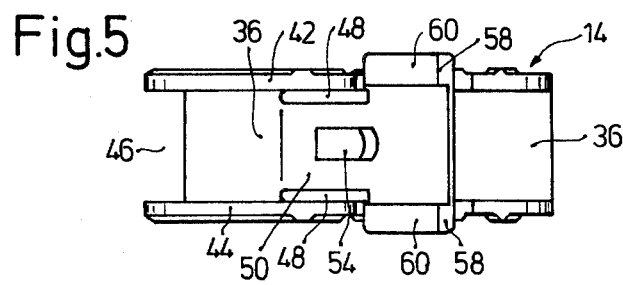
FIG. 5 is a plan view of the connecting element.

The U-shaped connecting element 14 has lateral projections 42 and 44 arranged at both lateral sides thereof, as can be seen particularly from FIG. 5. The lateral projections 42 and 44 extend outwardly beyond the base portion of the connecting element by a distance exceeding the thickness of the wiper arm 10 and in the region which in operation is embraced by the hook-shaped end part 24 of the wiper arm 10. Thereby, contact between the wiper arm 10 or its hook-shaped end part 24 and the supporting portion 16 of the wiping element 12 is prevented. At the same time, the hook-shaped end part 24 of the wiper arm 10 is received in the thus-formed U-shaped curved passage 46. The passage 46 transits, in its one end region, into the recess 40.

The projecting portion 36 of the connecting element 14 has a central portion 50 provided with slots 48 and recesses 52 so as to form a free tongue or elastic portion. The connecting element 14 is an integral member which is preferably constituted by a resilient synthetic plastic material. It is so formed that the central elastic portion 50 encloses with the projecting portion 34 and acute angle α. This angle is open in the direction away from the hole 32 of the connecting element 14.

The central portion 50 has a projection 54 which extends into the passage 46. A hole 56 is formed in a transition region between the arm section 26 and the remainder section of the wiper arm 10. The projection 54 is also provided with the lateral projections 42 and 44. Each of the lateral projections has a section 58 having a thickened region 60 formed at a free end of the section. The thickened region 60 extends outwardly beyond the wiper arm by a distance which is greater than the height of the projection 54 on the central portion 50.

When the wiper arm 10 is to be connected with the supporting portion 16 of the wiping element 12, which supporting portion 16 is connected with the connecting element 14 by the axle 22, the connecting element 14 together with the wiping element 12 must be inserted into the hook-shaped end part 24 of the wiper arm 10 by movement of the former in the direction of the arrow 62. Thereby, the central portion 50 occupies a position which is shown in FIG. 1. In this position the central portion 50 is biased against an inner surface of the hook-shaped end part 24 of the wiper arm 10. At the same time, the projection 54 engages in the hole 56 so as to make impossible unintentional removal of the wiping element 12 from the wiper arm 10. Further, the arm section 28 is received, in this position into the recess 40 of the connecting element 14, whereby improved guidance of the hook-shaped end part 24 of the wiper arm 10 is guaranteed.

In order to remove the wiping element 12 from the wiper arm 10 the projecting portions 34 and 36 must be pressed toward one another by a distance which is somewhat greater than the height of the projection 54 of the central portion 50. This is performed, in accordance with the present invention, by pressing the section 58 of the central portion 50 in the direction of the arrow 64. Thereby, the central portion 50 is turned toward the projecting portion 34 of the connecting element 14. When the above-mentioned turning is so great that the projection 54 becomes disengaged from the hole 56, the wiping element 12 can be withdrawn from the hook-shaped end part 24 of the wiper arm 10 by movement of the former in a direction which is opposite to the direction of the arrow 62. In order to execute this movement it is not needed to remove the wiper arm 10 from its operational position or, in other words, to remove the wiper arm 10 from the vehicle window. This is possible inasmuch as the projecting portion 36 of the connecting element 14 or more particularly the central portion 50 thereof is provided with the section 58 which extends outwardly beyond a face of the wiper arm 10, which faces away from the vehicle window. More particularly, the section 58 extends outwardly beyond a face of the arm section 26, which faces away from the vehicle window.

It will be understood that each of the elements described above, or two or more together, may also find a useful application in other types of constructions, differing from the types described above.

While the invention has been illustrated and described as embodied in a wiping arrangement for wiping a vehicle window it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A wiping arrangement for wiping a vehicle window, comprising a wiping element; a driven arm element having an outer face which faces away from the vehicle window, and a hook-like end part which includes two arm sections connected with one another and bounding a gap therebetween, at least one of said arm sections having a first engaging formation; and a connecting element for releasably connecting said wiping element with said arm element, said connecting element being secured to said wiping element and located in said gap between said arm sections of said end part of said arm element, said connecting element having two projecting portions which are biased apart from one another and a second engaging formation arranged for engaging with said first engaging formation of said one arm section of said arm element whereby said connecting element and said wiping element secured thereto become connected with said arm element, said connecting element further having means for urging said one projecting portion toward the other projecting portion of said connecting element so that said engaging formations become disengaged from one another, whereby said connection of said connecting element and said wiping element with said arm element is interrupted and said wiping element can be withdrawn from said arm element, said means being arranged to be pressed by a user and extending outwardly beyond said outer face of said arm element in a direction away from the vehicle window and is not obstructed from outside, so that said means can be pressed by a user from outside at a side opposite to the vehicle window and thereby the withdrawal of said wiping element from said arm element can be performed without removing the latter from the vehicle window.

2. A wiping arrangement as defined in claim 1, wherein the other arm section of said arm element is located adjacent to the vehicle window whereas said one arm section is spaced from the latter and forms said face of said arm element, said urging means projecting outwardly beyond said one arm section of said arm element and in a direction away from the vehicle window.

3. A wiping arrangement as defined in claim 1, wherein said wiping element has an axle, said connecting element being pivotally connected to said axle.

4. A wiping arrangement as defined in claim 1, wherein said connecting element is substantially U-shaped.

5. A wiping arrangement as defined in claim 1, wherein said arm sections of said arm element have first surfaces facing toward one another, said projecting portions of said connecting element having second surfaces which face away from one another and each of which abuts against a respective one of said first surfaces of said arm sections of said arm element.

6. A wiping arrangement as defined in claim 1, wherein said projecting portions of said connecting element have lateral projections bounding a passage in which said hook-shaped end part of said arm element is received.

7. A wiping arrangement as defined in claim 6, wherein said urging means is formed as a portion of each of said lateral projections.

8. A wiping arrangement as defined in claim 7, wherein each of said lateral projections has a predetermined thickness, each of said portions of said lateral projections having a thickness which exceeds the thickness of a remainder portion of each of said lateral projections.

9. A wiping arrangement as defined in claim 1, wherein said one projecting portion of said connecting element is elastic, said second engaging formation being arranged on said elastic one projecting portion of said connecting element.

10. A wiping arrangement as defined in claim 1, wherein said other projecting portion of said connecting element has a recess for receiving the other arm section of said arm element.

11. A wiping arrangement as defined in claim 10, wherein said one arm section is connected with a remainder portion of said arm element, whereas said other arm section forms a free end section of said hook-shaped end part of said arm element, which is received in said recess of said other projecting portion of said connecting element.

12. A wiping arrangement as defined in claim 1, wherein said first engaging formation provided in said arm element is a hole, said second engaging formation provided on said connecting element is an engaging projection which is engageable into said hole.

13. A wiping arrangement as defined in claim 1, wherein said connecting element is an integral member.

14. A wiping arrangement as defined in claim 13, wherein said integral member is constituted by a resilient synthetic plastic material.

15. A wiping arrangement as defined in claim 1, wherein said other projecting portion of said connecting element has a recess for receiving the other arm section of said arm element, said one projecting portion of said connecting element being elastic and having an elastically deflectable section at a side which faces away from said recess of said other projecting portion.

16. A wiping arrangement as defined in claim 15, wherein said first engaging formation is a hole provided in said arm element, said second engaging formation being an engaging projection which is arranged on said section of said one projecting portion of said connecting element at a side facing away from said recess of said other projecting portion and being engageable to said hole of said arm element.

17. An arrangement as defined in claim 1 wherein said means is arranged so that the urging of said one projecting portion toward said other projecting portion of said connecting element is performed by pressing said means in a direction from outside of the arrangement toward the vehicle window.

* * * * *